(12) United States Patent
Akaba et al.

(10) Patent No.: US 6,664,507 B2
(45) Date of Patent: Dec. 16, 2003

(54) LASER MACHINING APPARATUS

(75) Inventors: Takashi Akaba, Kobe (JP); Tadashi Nagashima, Kobe (JP); Takashi Ishide, Takasago (JP); Syuhou Tsubota, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 55 days.

(21) Appl. No.: 09/926,680

(22) PCT Filed: Mar. 30, 2001

(86) PCT No.: PCT/JP01/02738

§ 371 (c)(1),
(2), (4) Date: Nov. 30, 2001

(87) PCT Pub. No.: WO01/72465

PCT Pub. Date: Oct. 4, 2001

(65) Prior Publication Data

US 2002/0134768 A1 Sep. 26, 2002

(30) Foreign Application Priority Data

Mar. 30, 2000 (JP) .......................... 2000-93599

(51) Int. Cl.⁷ .......................... B23K 9/095; B23K 26/00
(52) U.S. Cl. .................. 219/130.5; 219/121.63
(58) Field of Search .................. 219/130.5, 74, 219/75, 121.63, 121.64

(56) References Cited

U.S. PATENT DOCUMENTS 6,034,343 A * 3/2000 Hashimoto et al. .... 219/121.63
6,294,754 B1 * 9/2001 Nagura et al. ......... 219/121.63

FOREIGN PATENT DOCUMENTS

| JP | 54-39340 | 3/1979 |
| JP | 60-234783 | 11/1985 |
| JP | 62-263869 | 11/1987 |
| JP | 5-69165 | 3/1993 |
| JP | 2001-96384 | 4/2001 |
| WO | 00/54923 | 9/2000 |

* cited by examiner

Primary Examiner—Clifford C. Shaw
(74) Attorney, Agent, or Firm—Oblon, Spivak, McClelland, Maier & Neustadt, P.C.

(57) ABSTRACT

Control is exercised such that an arc discharge from a GMA electrode is performed after or simultaneously with start of oscillation of laser light from a laser oscillator, and oscillation of the laser light from the laser oscillator is stopped after or simultaneously with termination of the arc discharge from the GMA electrode. A coaxial laser beam machining head is configured such that the GMA electrode is disposed in a space portion between a first divisional laser beam and a second divisional laser beam, which have been formed by division by first and second reflecting mirrors, coaxially with the laser beams. Alternatively, the coaxial laser beam machining head is configured such that the GMA electrode is disposed in a space portion, which has been formed in a body of laser light by withdrawing part of the laser light outwardly with the use of first and second reflecting mirrors, coaxially with the body of the laser light.

13 Claims, 14 Drawing Sheets

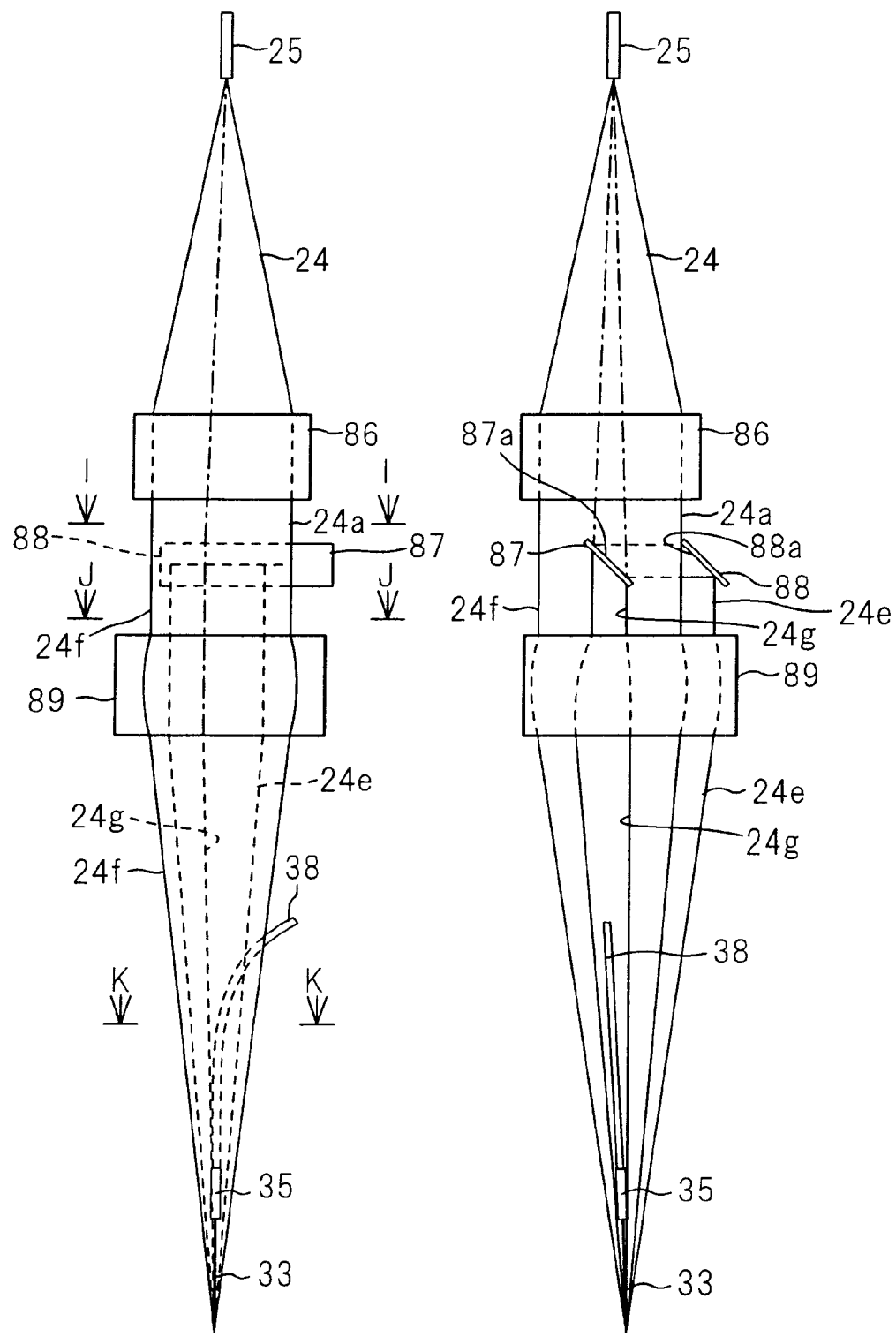

LASER MACHINING APPARATUS

TECHNICAL FIELD

This invention relates to a laser beam machining apparatus.

BACKGROUND ART

Among welding techniques for joining metals together are laser beam welding and arc welding. Laser beam welding is performed using a $CO_2$ laser oscillator or a YAG laser oscillator. $CO_2$ laser light has to be mirror transmitted, and thus its adjustment is laborious, while YAG laser light can be transmitted by an optical fiber. Under these circumstances, expectations are rising for laser beam welding using a YAG laser oscillator. Arc welding comes in types, including gas shielded consumable electrode arc welding (GMA welding) such as MIG welding, and gas shielded non-consumable electrode arc welding such as TIG welding.

Laser light is concentrated by an optical instrument to give a high energy density. Laser beam welding with such laser light achieves deep weld penetration in a narrow range of melting. With arc welding such as GMA welding (MIG welding, etc.) or TIG welding, on the other hand, the arc spreads in a relatively broad range, thus performing welding of a wide bead range, and enabling welding with a high groove tolerance.

In recent years, methods for simultaneously performing laser beam welding and arc welding have been studied in attempts to carry out welding with a wide welding range and a deep weld penetration.

A laser beam machining head, which performs laser welding and arc welding simultaneously, has a configuration, for example, disclosed in Japanese Unexamined Patent Publication No. 1998-216972. As shown in FIG. 14, this laser beam machining head performs laser beam welding and arc welding by applying laser light 103 from a laser beam welding head 102 to a portion 101a, to be welded, of a base metal 101, and simultaneously applying an arc discharge from an electrode 105 of a GMA welding head 104, while jetting a shielding gas at the portion 101a from a gas jet nozzle 106.

However, this laser beam machining head is large in size as a whole, since the laser beam welding head 102 and the GMA welding head 104 are independent in the laser beam machining head. Moreover, it is tiresome to keep the relative positional relationship between the laser beam welding head 102 and the GMA welding head 104 always constant in response to a change in the welding position or the welding posture. Thus, the laser beam machining head is not suitable, particularly, for three-dimensional machining by a robot.

The inventors of the present invention proposed in Japanese Unexamined Patent Publication No. 1999-156573 a laser beam machining head capable of solving the above-described problems. In this laser beam machining head, as shown in FIG. 15, laser light 112 transmitted by an optical fiber 111 is reflected by a convex roof mirror 113 and a concave roof mirror 114, and divided thereby into two divisional beams, a first divisional laser beam 112a and a second divisional laser beam 112b, with a space portion 117 being formed therebetween. These divisional laser beams 112a and 112b are focused by a focusing lens array 115 onto a portion to be welded.

The concave roof mirror 114 and the focusing lens array 115 are perforated, at the center thereof, with through-holes 114a and 115a, respectively. An electrode holding pipe 116 for holding an arc electrode, such as a TIG electrode or a GMA electrode, is inserted through the through-holes 114a, 115a, whereby the arc electrode held by the electrode holding pipe 116 is located in the space portion 117 between the divisional laser beams 112a and 112b and rendered coaxial with these laser beams.

When laser beam welding and arc welding are performed simultaneously, irradiation with laser light evaporates a metal (base metal) to ionize the metal partially (into Fe ions, Cr ions, Ni ions, etc.), and an arc discharge is induced thereby. Thus, the arc can be stabilized, so that a marked improvement in welding performance can be achieved.

To stabilize the arc reliably with laser light, however, it is necessary to control, without fail, the timing of oscillating (projecting) laser light and the timing of performing arc discharge. However, no proposal has been made for an apparatus for such control.

To carry out laser beam welding and arc welding at the same time, it is desirable to use a coaxial laser beam machining head. With the above-mentioned conventional coaxial laser beam machining head, the through-holes 114a and 115b are provided in the concave roof mirror 114 and the focusing lens array 115. Processing of these members takes much time and effort, and the through-hole portions are easily damaged. Furthermore, the convex roof mirror 113 and the concave roof mirror 114 are used to divide the laser light 112 into two beams, but these concave and convex roof mirrors 113 and 114 are very expensive.

Accordingly, the present invention has been accomplished to solve the above problems, and its challenge is to provide a laser beam machining apparatus capable of reliably stabilizing an arc when performing laser beam welding and arc welding at the same time, and having a coaxial laser beam machining head which is small in size, free from the risk of damage to optical equipment, and inexpensive.

DISCLOSURE OF THE INVENTION

A laser beam machining apparatus, as a first invention for solving the above challenge, is a laser beam machining apparatus adapted to perform, simultaneously, laser beam welding for welding a portion, to be welded, by transmitting and condensing laser light oscillated by a laser oscillator, and applying the laser light to the portion to be welded, and arc welding or filler wire welding for welding the portion, to be welded, by an arc discharge from an arc electrode, characterized by including control means for exercising control such that the arc discharge from the arc electrode is performed after or simultaneously with start of oscillation of the laser light from the laser oscillator, and an output of the laser light from the laser oscillator is stopped after or simultaneously with termination of the arc discharge from the arc electrode.

According to the laser beam machining apparatus of the first invention, therefore, arc discharge can be reliably induced by laser light, and the arc can be stabilized thereby, from the start to the end of welding.

A laser beam machining apparatus of a second invention is the laser beam machining apparatus of the first invention, characterized by including a coaxial laser beam machining head comprising the arc electrode disposed coaxially with the laser light.

According to the laser beam machining apparatus of the second invention, therefore, the laser light and the arc electrode are coaxial. Thus, the relative position of the laser light and the arc electrode is stable, and the induction of arc discharge by laser light can be performed easily.

A laser beam machining apparatus of a third invention is the laser beam machining apparatus of the second invention, characterized in that the coaxial laser beam machining head comprises:
one collimating optical system for making the laser light into a parallel beam;
a first reflecting mirror for reflecting part of the laser light made into the parallel beam by the collimating optical system to divide the laser light into a first divisional laser beam and a second divisional laser beam;
a second reflecting mirror for further reflecting the first divisional laser beam reflected by the first reflecting mirror to form a space portion between the first divisional laser beam and the second divisional laser beam;
one focusing optical system for focusing the first divisional laser beam and the second divisional laser beam onto a portion to be machined; and
an arc electrode disposed in the space portion between the first divisional laser beam and the second divisional laser beam coaxially with the laser beams.

According to the laser beam machining apparatus of the third invention, therefore, the laser beam machining head is very small in size, inexpensive, and free from the risk of damage to the optical equipment, in comparison with the conventional laser beam machining head. This laser beam machining head is so small in size that it can be easily mounted, for example, to a multi-axis NC robot. Moreover, the arc electrode and the laser light (the first and second divisional laser beams) are coaxial. Thus, the laser beam machining head can be easily positioned and moved to an arbitrary position by the multi-axis NC robot, and three-dimensional machining can be performed with ease. Also, coaxial welding by the arc electrode and the laser light makes welding at a very high speed possible. In addition, irradiation with laser light can stabilize the arc. Thus, welding of an SUS material or a high Cr material in a pure Ar gas atmosphere becomes possible, without the use of a special wire.

A laser beam machining apparatus of a fourth invention is the laser beam machining apparatus of the third invention, characterized in that the coaxial laser beam machining head is configured such that the second reflecting mirror is rendered normally and reversely rotatable, whereby spacing between a focused tip of the first divisional laser beam and a focused tip of the second divisional laser beam is adjustable.

According to the laser beam machining apparatus of the fourth invention, therefore, the rotation angle of the second reflecting mirror is set as desired to widen the spacing between the focused tip of the first divisional laser beam and the focused tip of the second divisional laser beam to a suitable degree, whereby a base metal with a broad gap width can be welded.

A laser beam machining apparatus of a fifth invention is the laser beam machining apparatus of the third invention, characterized in that the coaxial laser beam machining head is configured such that the first reflecting mirror is rendered movable, whereby the division ratio for the first divisional laser beam and the second divisional laser beam can be adjusted, and the second reflecting mirror is rendered normally and reversely rotatable, whereby the spacing between the focused tip of the first divisional laser beam and the focused tip of the second divisional laser beam can be adjusted.

According to the laser beam machining apparatus of the fifth invention, therefore, the moving position of the first reflecting mirror is set as desired to decrease the proportion of the first divisional laser beam to a suitable degree and increase the proportion of the second divisional laser beam to a suitable degree, and the rotation angle of the second reflecting mirror is set as desired to widen the spacing between the focused tip of the first divisional laser beam and the focused tip of the second divisional laser beam to a suitable degree, whereby the second divisional laser beam is first applied to the base metal with a deep weld penetration, and then the first divisional laser beam is applied to form an adequate bead. On this occasion, satisfactory welding without porosity (voids) can be performed.

A laser beam machining apparatus of a sixth invention is the laser beam machining apparatus of the third, fourth or fifth invention, characterized in that the coaxial laser beam machining head is configured such that the optical axis of the collimating optical system and the optical axis of the focusing optical system are displaced in a direction perpendicular to the optical axes, whereby the collimating optical system is moved over toward one side relative to the focusing optical system so that the first divisional laser beam reflected by the first and second reflecting mirrors is entered to the other side of the focusing optical system.

According to the laser beam machining apparatus of the sixth invention, therefore, as compared with the agreement between the optical axis of the collimating optical system and the optical axis of the focusing optical system, the first divisional laser beam and the second divisional laser beam can be focused even by the focusing optical system of a smaller diameter, and the entire laser beam machining head can be made smaller in size.

A laser beam machining apparatus of a seventh invention is the laser beam machining apparatus of the second invention, characterized in that the coaxial laser beam machining head comprises:
one collimating optical system for making the laser light into a parallel beam;
a reflecting mirror for reflecting part of the laser light made into the parallel beam by the collimating optical system to withdraw the part of the laser light out of a body of the laser light, thereby forming a space portion in the body of the laser light;
one focusing optical system for focusing the body of the laser light, where the space portion has been formed, onto a portion to be machined; and
an arc electrode disposed in the space portion of the body of the laser light coaxially with the body of the laser light.

According to the laser beam machining apparatus of the seventh invention, therefore, the laser beam machining head is very small in size, inexpensive, and free from the risk of damage to the optical equipment, in comparison with the conventional laser beam machining head. This laser beam machining head is so small in size that it can be easily mounted, for example, to a multi-axis NC robot. Moreover, the arc electrode and the body of laser light are coaxial. Thus, the laser beam machining head can be easily positioned and moved to an arbitrary position by the multi-axis NC robot, and three-dimensional machining can be performed with ease. Also, coaxial welding makes welding at a very high speed possible. In addition, welding of an SUS material or a high Cr material in a pure Ar gas atmosphere becomes possible.

A laser beam machining apparatus of an eighth invention is the laser beam machining apparatus of the second invention, characterized in that the coaxial laser beam machining head comprises:
one collimating optical system for making the laser light into a parallel beam;
a first reflecting mirror for reflecting part of the laser light made into the parallel beam by the collimating optical system to withdraw the part of the laser light out of a body of the laser light, thereby forming a space portion in the body of the laser light;
a second reflecting mirror located outside the body of the laser light and adapted to reflect the part of the laser light reflected by the first reflecting mirror so as to be parallel to the body of the laser light and be in contact with or in proximity to the outer peripheral surface of the body of the laser light;
one focusing optical system for focusing the body of the laser light, where the space portion has been formed by the first reflecting mirror, and the part of the laser light reflected by the first and second reflecting mirrors, onto a portion to be machined; and
an arc electrode disposed in the space portion of the body of the laser light coaxially with the body of the laser light.

According to the laser beam machining apparatus of the eighth invention, therefore, the laser beam machining head is very small in size, inexpensive, and free from the risk of damage to the optical equipment, in comparison with the conventional laser beam machining head. This laser beam machining head is so small in size that it can be easily mounted, for example, to a multi-axis NC robot. Moreover, the arc electrode and the body of laser light are coaxial. Thus, the laser beam machining head can be easily positioned and moved to an arbitrary position by the multi-axis NC robot, and three-dimensional machining can be performed with ease. Also, coaxial welding makes welding at a very high speed possible. In addition, welding of an SUS material or a high Cr material in a pure Ar gas atmosphere becomes possible. Furthermore, part of the laser light taken out of the body of the laser light by the first reflecting mirror is further reflected by the second reflecting mirror, and focused to the portion to be machined, together with the body of the laser light, by the focusing optical system. Thus, the energy of the laser light is not wasted, but can be effectively used to minimize a loss of the laser light.

A laser beam machining apparatus of a ninth invention is the laser beam machining apparatus of the eighth invention, characterized in that the first reflecting mirror of the coaxial laser beam machining head is inserted into the laser light, which has been made into the parallel beam by the collimating optical system, along a diametrical direction of a cross sectional plane of the laser light and obliquely relative to the optical axis of the laser light, and is also inclined in a direction perpendicular to the direction of insertion of the first reflecting mirror, whereby part of the laser light is reflected obliquely to the outside of the body of the laser light.

According to the laser beam machining apparatus of the ninth invention, therefore, part of the laser light taken out of the body of the laser light is located just beside the body of the laser light. Thus, as compared with part of the laser light being located at a position displaced from the position just beside the body of the laser light, the diameter of the focusing optical system can be rendered smaller, and the entire laser beam machining head can be made smaller in size.

A laser beam machining apparatus of a tenth invention is the laser beam machining apparatus of the eighth or ninth invention, characterized in that the coaxial laser beam machining head is configured such that the optical axis of the collimating optical system and the optical axis of the focusing optical system are displaced in a direction perpendicular to the optical axes, whereby the collimating optical system is moved over toward one side relative to the focusing optical system so that part of the laser light reflected by the first and second reflecting mirrors is entered to the other side of the focusing optical system.

According to the laser beam machining apparatus of the tenth invention, therefore, as compared with the agreement between the optical axis of the collimating optical system and the optical axis of the focusing optical system, the body of the laser light and part of the laser light can be focused even by the focusing optical system of a smaller diameter, and the entire laser beam machining head can be made smaller in size.

BRIEF DESCRIPTION OF THE DRAWINGS

FIG. 10A is a side view showing the configuration of an essential part of the laser beam machining head, and is a view as viewed in a direction of an arrow G in FIG. 12A.

FIG. 10B is a side view showing the configuration of the essential part of the laser beam machining head, and is a view as viewed in a direction of an arrow H in FIG. 12A.

BEST MODE FOR CARRYING OUT THE INVENTION

Embodiments of the present invention will now be described in detail based on the accompanying drawings.

Figure 1:
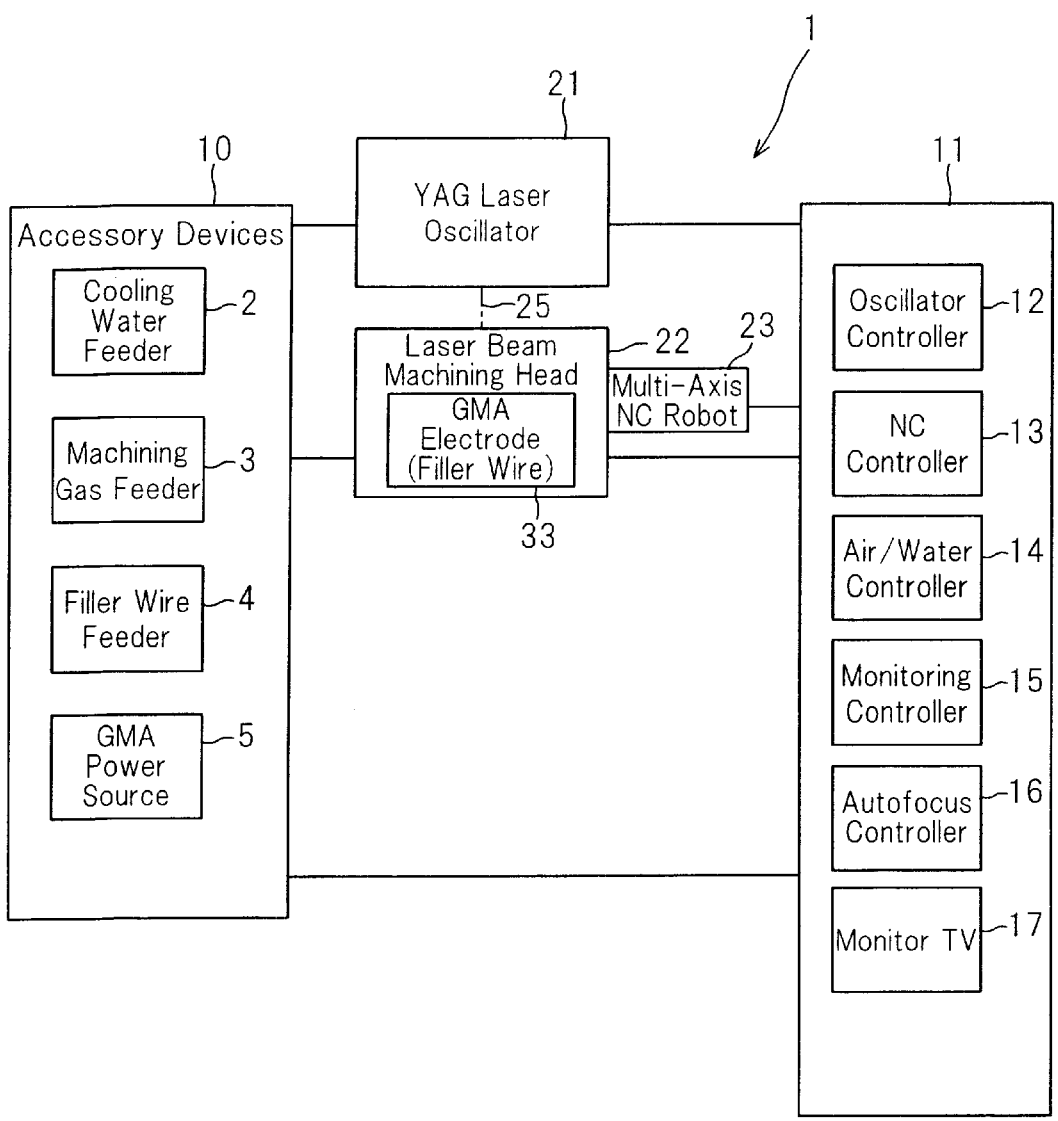
FIG. 1 is a system configuration diagram of a laser beam machining apparatus according to an embodiment of the present invention.

As shown in FIG. 1, a laser beam machining apparatus 1 according to the present embodiment is equipped with a YAG laser oscillator 21, a laser beam machining head 22, a multi-axis NC robot 23, accessory devices 10, and a machining apparatus control panel 11.

Laser light oscillated from the YAG laser oscillator 21 is transmitted to an input portion of the coaxial laser beam machining head 22 by an optical fiber 25 as optical transmission means. The coaxial laser beam machining head 22 is mounted to the multi-axis NC robot 23 as laser beam machining head moving means, and positioned and moved to an arbitrary position by the multi-axis NC robot 23. The coaxial laser beam machining head 22 comprises a GMA electrode (MIG electrode or the like) 33, etc. disposed coaxially with the laser light, and its concrete configuration will be described later.

As the accessory devices 10, a cooling water feeder 2, a machining gas feeder 3, a filler wire feeder 4, and a GMA power source 5 are provided. The machining apparatus control panel 11 is provided with an oscillator controller 12, an NC controller 13, an air/water controller 14, a monitoring controller 15, an autofocus controller 16, and a monitor TV 17.

The cooling water feeder 2 supplies cooling water to each heating unit of the laser beam machining apparatus 1, such as a heating unit of the YAG laser oscillator 21, by a command from the air/water controller 14, where necessary, at the time of welding. The machining gas feeder 3 supplies an inert gas, such as an Ar gas, as a shielding gas to a portion, to be welded, at the time of welding. The filler wire feeder 4 supplies a filler wire (consumable electrode), as the GMA electrode 33, in the vicinity of the portion to be welded, at the time of welding.

The GMA power source 5 supplies an electric power to the GMA electrode 33, fed by the filler wire feeder 4, to generate an arc discharge. The oscillator controller 12 controls a power source of the YAG laser oscillator 21 to control the oscillation timing and output of laser light oscillated from the YAG laser oscillator 21. The oscillator controller 12 and the GMA power source 5 cooperate to control timings with which to apply laser light and arc discharge to the portion to be welded. The details will be offered later.

The NC controller 13 controls motions of the multi-axis NC robot 23. The monitoring controller 15 issues commands to the NC controller 13, autofocus controller 16, oscillator controller 12, and GMA power source 5 so as to adjust and control the position of the laser beam machining head 22, the focus position of laser light, the support state of the GMA electrode 33, laser output, GMA current value, etc. according to the light emission status, etc., at the portion to be welded, of laser light transmitted via the optical fiber, etc. (not shown).

The autofocus controller 16 controls the focusing optical system based on a command or the like from the monitoring controller 15 to control the focal point position of the laser light. The monitor TV 17 reflects the light emission status of the portion to be welded, or the situation within the laser beam machining head that have been shot with a CCD camera (not shown). An operator monitors a picture on the monitor TV 17, and takes proper action immediately if a problem or the like occurs.

Figure 2:
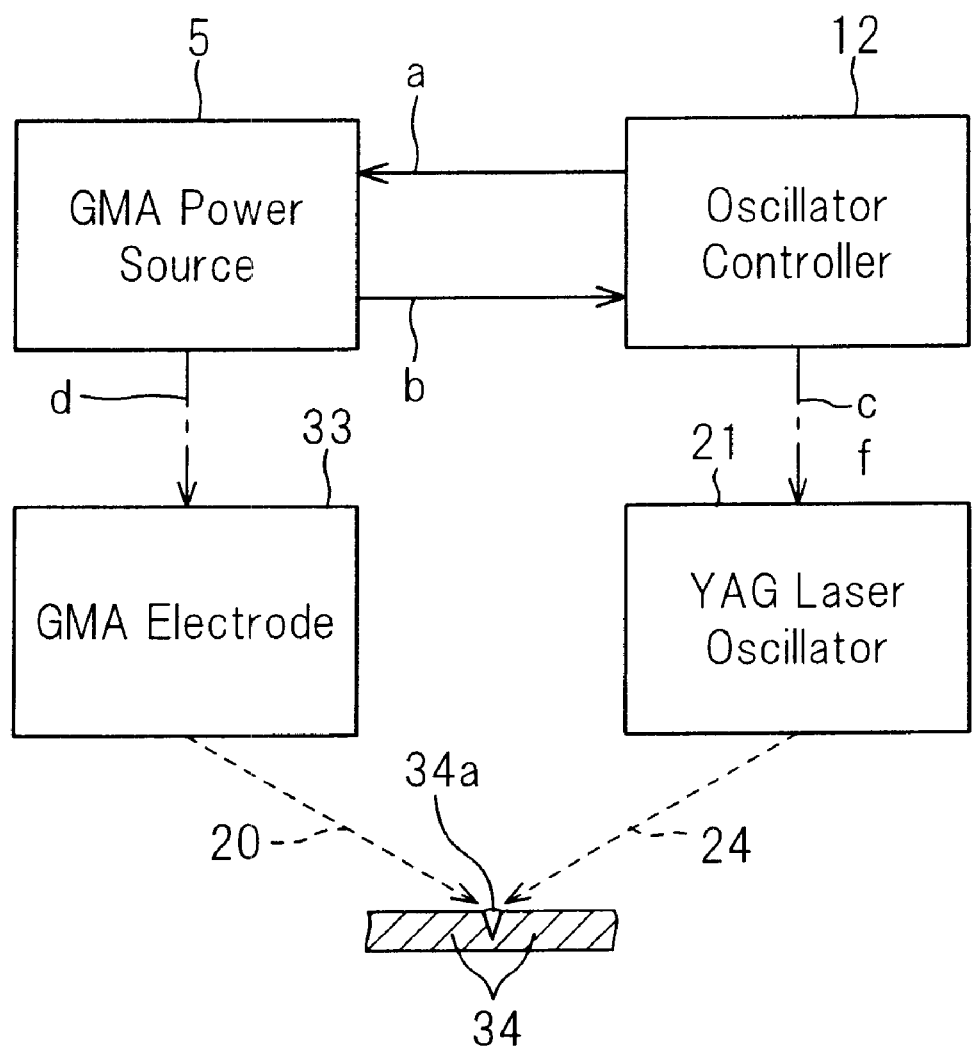
FIG. 2 is a control block diagram concerned with control of timings of laser oscillation and arc discharge in the laser beam machining apparatus.
Figure 3:
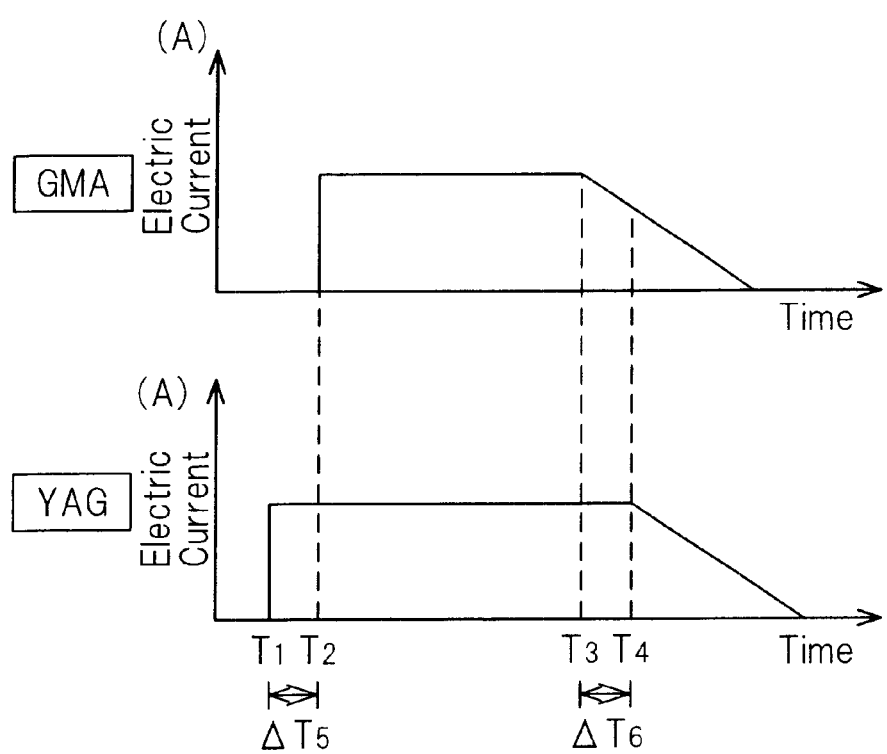
FIG. 3 is a graph of timings of laser oscillation and arc discharge.

The present laser beam machining apparatus 1 controls the timings of outputting (application) of laser light and arc discharge as shown in FIGS. 2 and 3. That is, the timing control is performed as in (1) to (4) below.

(1) To start welding at a time $T_1$, the oscillator controller 12 issues an output start signal c to the YAG laser oscillator 21. The YAG laser oscillator 21 starts delivery of laser light 24 based on the output start signal c and applies it to a portion 34a, to be welded, of a base material 34. In actuality, divisional laser beams formed by dividing the laser light 24 in two are gathered and applied (see FIGS. 5A, 5B, and 9; details will be offered later on).

(2) At a time $T_2$ after a lapse of $\Delta T_5$ from the start of output of the laser light 24 based on the output start signal c, the oscillator controller 12 produces a discharge start signal a for the GMA power source 5. Based on the discharge start signal a, the GMA power source 5 starts power supply d to the GMA electrode 33, whereupon the GMA electrode 33 starts arc discharge 20. Thus, laser beam welding and arc welding are performed simultaneously.

(3) In terminating welding at a time $T_3$, power supply d from the GMA power source 5 to the GMA electrode 33 is stopped. However, if the electric current value is abruptly lowered, a large hole is bored in the bead of the portion 34 to be welded. To prevent this situation, the electric current value is gradually lowered in the GMA power source 5 as shown in FIG. 3.

(4) At a time $T_4$ after a lapse of $\Delta T_6$ from the stoppage of power supply d to the GMA electrode 33 (from the initiation of a fall in the electric current value), the GMA power source 5 delivers an output stop signal b to the oscillator controller 12. The oscillator controller 12 delivers an oscillation stop signal f to the YAG laser oscillator 21 on the basis of the output stop signal b. The YAG laser oscillator 21 stops output of laser light 24 based on the output stop signal f. At this time, the electric current value (output of laser light) is gradually lowered in the YAG laser oscillator 21 in accordance with a decrease in the electric current value of the GMA power source 5.

According to the laser beam machining apparatus 1 of the present embodiment, as described above, control is exercised by the oscillator controller 12 and the GMA power source 5 such that the arc discharge 20 from the GMA electrode 33 is begun after delivery of the laser light 24 from the YAG laser oscillator 21 is started, and output of the laser light 24 from the YAG laser oscillator 21 is stopped after the arc discharge 20 from the arc electrode 33 is terminated. Thus, the arc discharge 20 is reliably induced by the laser light 24 to stabilize arc from the initiation of welding until its completion.

In the foregoing description, the arc discharge 20 is begun after output of the laser light 24 is started, and output of the laser light 24 is stopped after the arc discharge 20 is terminated. However, this method is not limitative, and it is permissible to start the arc discharge 20 simultaneously with starting the output of the laser light 24, and stop the output of the laser light 24 simultaneously with stopping the arc discharge 20.

To perform the induction of the arc discharge 20 by the laser light 24 more reliably, however, it is desirable to begin the arc discharge 20 after starting the output of the laser light 24, and stop the output of the laser light 24 after terminating the arc discharge 20. In this case, the period $\Delta T_5$ from initiation of the output of the laser light 24 until start of the arc discharge 20 is in the rang of 0.1 to 5 seconds, preferably in the range of 0.1 to 1.0 second. The period $\Delta T_6$ from stoppage of the arc discharge 20 until termination of oscillation of the laser light 24 is in the rang of 0.1 to 5 seconds, preferably in the range of 0.1 to 1.0 second. The reasons are that stabilization of a laser takes time, and that a stable arc can be generated based on laser light.

As noted above, signal transmission and reception are carried out between the oscillator controller 12 and the GMA power source 5 to exercise timing control for laser output and arc discharge as shown in FIG. 3. However, this method is not restrictive. For example, a laser output start command, a laser output stop command, a discharge start command, and a discharge stop command may be issued from other control devices to the oscillator controller 12 and the GMA power source 5 to perform timing control as shown in FIG. 3. Furthermore, in exerting timing control as shown in FIG. 3, the electric current value (laser light output) of the oscillator controller 12 and the electric current value (arc discharge output) of the GMA power source 5, for example, may be confirmed to exercise timing control more reliably. Anyway, the timings of laser output and arc discharge may be controlled such that arc discharge from the GMA electrode 33 is performed after or simultaneously with delivery of the laser light 24 from the YAG laser oscillator 21 is started, and delivery of the laser light 24 from the YAG laser oscillator 21 is stopped after or simultaneously with arc discharge from the GMA electrode 33 is stopped. Besides, laser output, the GMA electric current value and the multi-axis NC speed are controlled based on the information from the monitoring controller 15 to carry out optimal welding.

Such timing control is desirably applied to the laser beam machining apparatus 1 equipped with the coaxial laser beam machining head 22 of a configuration to be described later. However, this application is not limitative, and the timing control can be applied widely to a laser beam machining apparatus for performing laser beam welding and arc welding simultaneously, such as a laser beam machining apparatus equipped with a coaxial laser beam machining head of other configuration, or a laser beam machining apparatus having a laser beam welding head and a GMA welding head present independently. When the coaxial laser beam machining head is provided, laser light and an arc electrode are coaxial. Thus, their relative position is stable, and induction of an arc discharge by laser light can be performed easily.

The configuration of the coaxial laser beam machining head 22 can be explained based on FIGS. 4 to 8.

Figure 4:
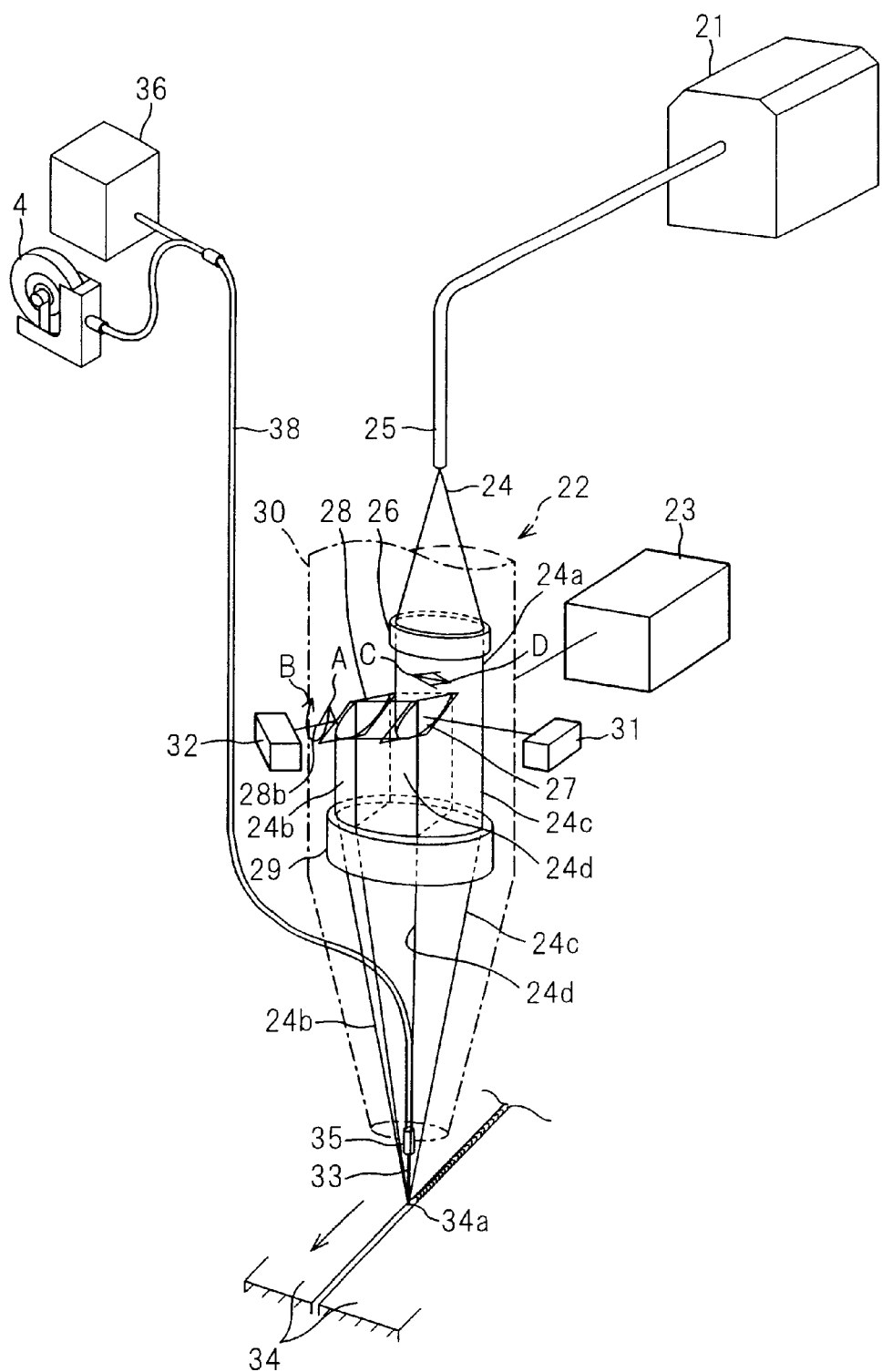
FIG. 4 is a perspective view showing an abridged configuration of a laser beam machining head according to the embodiment of the present invention.

As shown in FIG. 4, a laser beam machining head 22 has in an outer cylinder 30 a collimating lens array 26 as one collimating optical system, a first reflecting mirror 27, a second reflecting mirror 28, a focusing lens array 29 as one focusing optical system, and a GMA electrode (MIG electrode or the like) 33 as a tip machining portion of GMA welding means (MIG welding means or the like). When the second reflecting mirror 28 is normally and reversely rotatable, a mirror turning device 32 comprising an electric motor or the like is provided as mirror turning means. When the first reflecting mirror 27 is to be made movable, moreover, a mirror moving device 31 comprising an electric motor or the like is provided as mirror moving means.

Figure 5A:
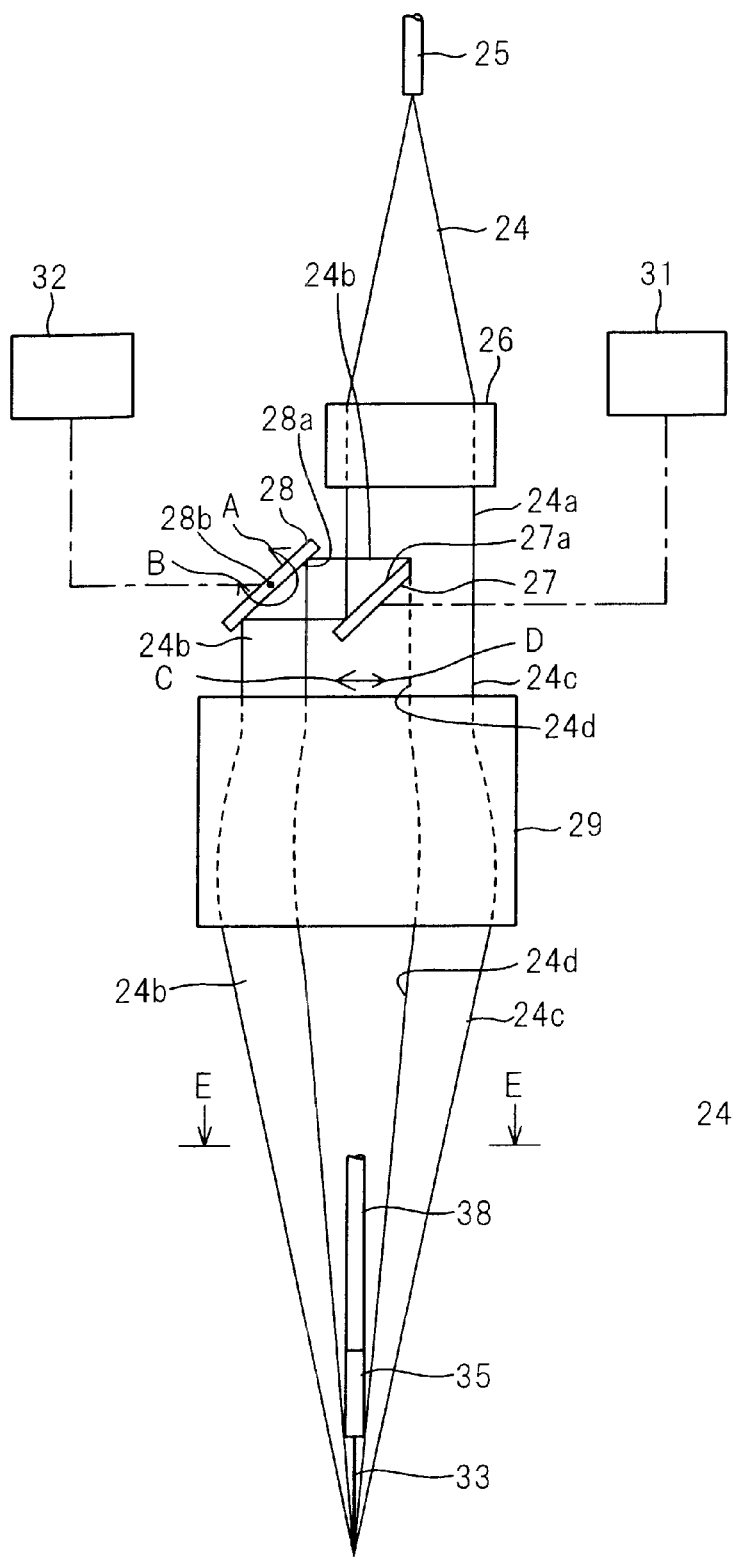
FIG. 5A is a side view showing the configuration of an essential part of the laser beam machining head.
Figure 5B:
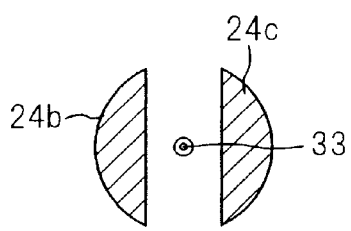
FIG. 5B is a sectional view taken on line E—E of FIG. 5A.

A detailed description will be offered based on FIGS. 4, 5A and 5B. The collimating lens array 26 is composed of a plurality of lenses arranged in series for making laser light 24, which has been transmitted by an optical fiber 25, into a parallel beam. The first reflecting mirror 27 and the second reflecting mirror 28 are disposed below the collimating lens array 26 in the drawings, and the focusing lens array 29 is disposed below these reflecting mirrors 27 and 28 in the drawings.

The first reflecting mirror 27 is a flat mirror, and is inserted into a laser beam 24a, which has been rendered parallel by the collimating lens array 26, in a direction perpendicular to the optical axis of the laser beam 24a as far as a central part of a cross sectional plane of the laser beam 24a, and a reflecting surface 27a of the first reflecting mirror 27 is inclined upward (toward the collimating lens array) and outward (leftward in the drawings). Thus, the first reflecting mirror 27 reflects part of the laser beam 24a (a left half thereof in the drawings) outward (leftward in the drawings) to divide the laser beam 24a into two halves, i.e., a first divisional laser beam 24b and a second divisional laser beam 24c.

The second reflecting mirror 28 is a flat mirror similar to the first reflecting mirror 27. The second reflecting mirror 28 is disposed sideways of the first reflecting mirror 27, and has a reflecting surface 28a inclined downward (toward the focusing lens array) and toward the first reflecting mirror 27 (rightward in the drawings). Thus, according to the second reflecting mirror 28, the first divisional laser beam 24b reflected by the first reflecting mirror 27 is further reflected downward in the drawings parallel to the first divisional mirror 24c to form a space portion (spacing) 24d between the first divisional laser beam 24b and the second divisional laser beam 24c.

The focusing lens array 29 is composed of a plurality of lenses arranged in series, and focuses the first divisional laser beam 24b, which has been reflected by the first and second reflecting mirrors 27 and 28, and the second divisional laser beam 24c, which has been transmitted as such downwardly in the drawings without being reflected by the first reflecting mirror 27, onto a portion 34a, to be welded, of a base material 34. At this time, the first divisional laser beam 24b and the second divisional laser beam 24c are focused to one point. That is, the laser beam 24a is a parallel beam. Thus, even if the optical path lengths of the first divisional laser beam 24b and the second divisional laser beam 24c are different between the collimating lens array 26 and the focusing lens array 29, these first and second divisional laser beams 24b and 24c can be focused to the one point by the focusing lens array 29.

The focusing lens array 29 is somewhat greater in diameter than the collimating lens array 26. The optical axis of the collimating lens array 26 and the optical axis of the focusing lens array 29 are displaced in a direction perpendicular to these optical axes, whereby the collimating lens array 26 is brought to one side (right side in the drawings) relative to the focusing lens array 29, and the first divisional laser beam 24b reflected by the first and second reflecting mirrors 27 and 28 is entered into the other side (left side in the drawings) of the focusing lens array 29.

Because of the above configuration, the second divisional laser beam 24c transmitted straightly from the collimating lens array 26 to the focusing lens array 29, and the first divisional laser beam 24b separated in a direction perpendicular to the optical axis with respect to the second divisional laser beam 24c (i.e., in a leftward direction in the drawings) are incident on the single focusing lens array 29. Since the single focusing lens array 29 focuses both of the divisional laser beams 24b and 24c, the entire laser beam machining head is very small in size. The diameter of the focusing lens array 29 is, for example, about 70 mm.

On the output side of the focusing lens array 29 (the lower side in the drawings), the GMA electrode 33 is supported by the outer cylinder 30 and disposed in the space portion 24d between the first divisional laser beam 24b and the second divisional laser beam 24c coaxially with these laser beams. According to this configuration, GMA/YAG coaxial welding is possible. With GMA welding means, power supply and feeding of an inert gas are performed from a GMA welding machine 36 having the aforementioned GMA power source 5 and machining gas feeder 3 (see FIG. 1) to a GMA head 35 at the tip via a guide pipe 38, and the GMA electrode (filler wire) 33 is fed from the filler wire feeder 4, whereby GMA welding is carried out.

Figure 6:
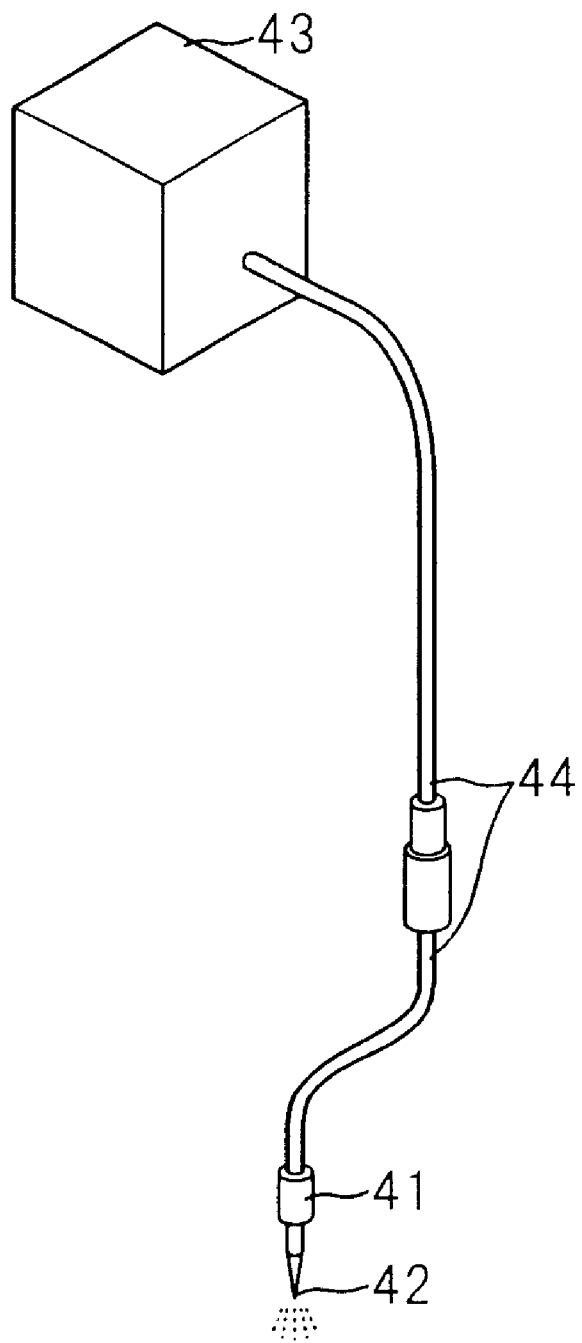
FIG. 6 is a perspective view showing the configuration of TIG welding means.

Instead of the GMA welding means, TIG welding means as shown in FIG. 6 may be provided. In this TIG welding means, a TIG (tungsten) electrode 42 is held by a TIG head 41, and fed with an electric power and an inert gas from a TIG welding machine 43 via a guide tube 44 to perform TIG welding. In this case, the TIG electrode 42 is disposed in the space portion 24d between the first divisional laser beam 24b and the second divisional laser beam 24c coaxially with these laser beams. In this condition, laser beam welding and TIG welding are performed simultaneously.

Figure 7:
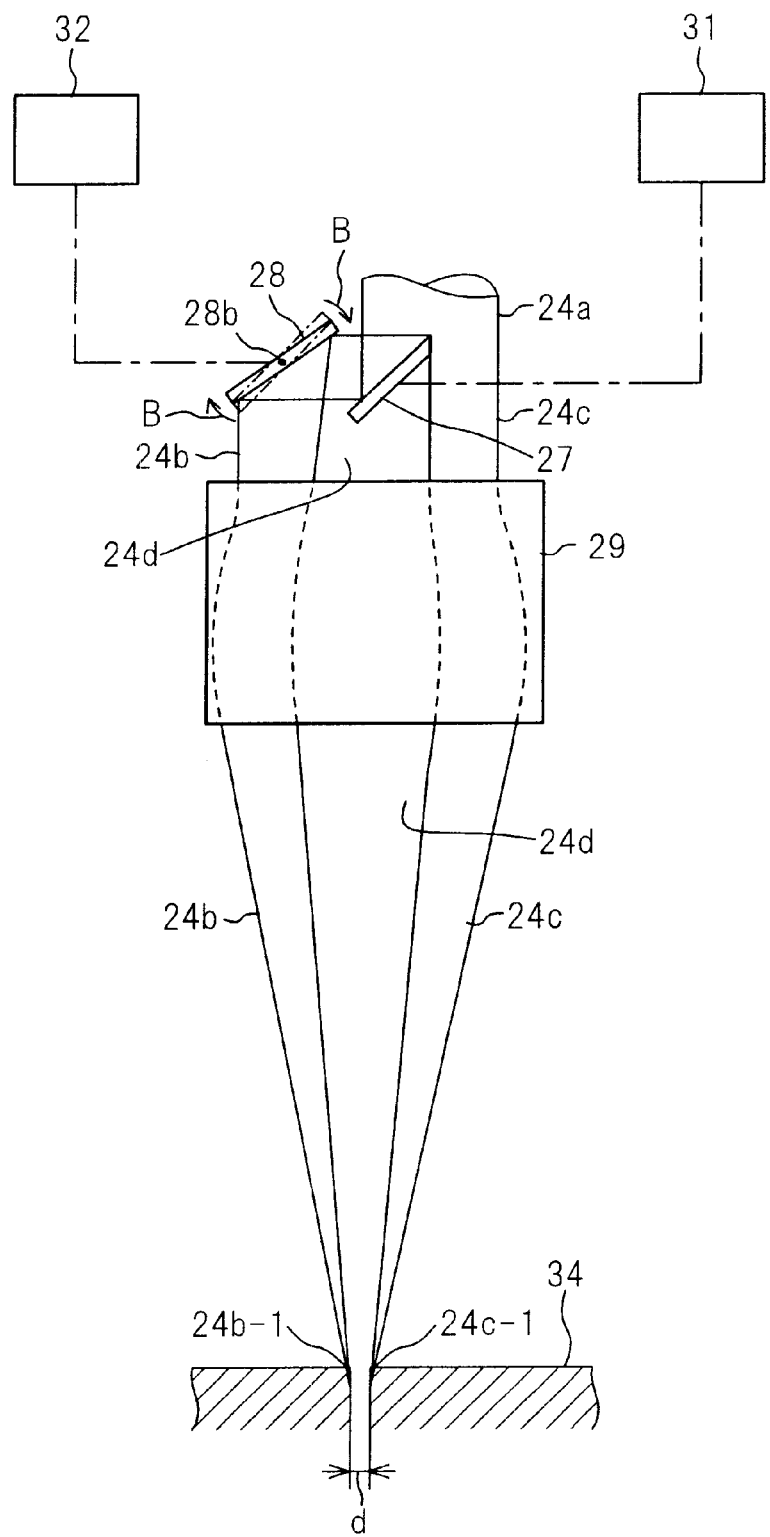
FIG. 7 is an explanation drawing showing a state in which focused tips of laser beams formed by division in the laser beam machining head are spaced.

As shown in FIGS. 4, 5A and 5B, the mirror turning device 32 rotates the second reflecting mirror 28 in a direction of an arrow A or the opposite direction of an arrow B about a center shaft 28b. Thus, when the second reflecting mirror 28 is rotated in the direction of the arrow B by the mirror turning device 32 as shown in FIG. 7, the angle of reflection of the first divisional laser beam 24b by the second reflecting mirror 28 is changed to provide spacing d between a focused tip 24b-1 of the first divisional laser beam 24b and a focused tip 24c-1 of the second divisional laser beam 24c. This spacing d can be set, as desired, by adjusting the rotation angle of the second reflecting mirror 28.

Figure 8:
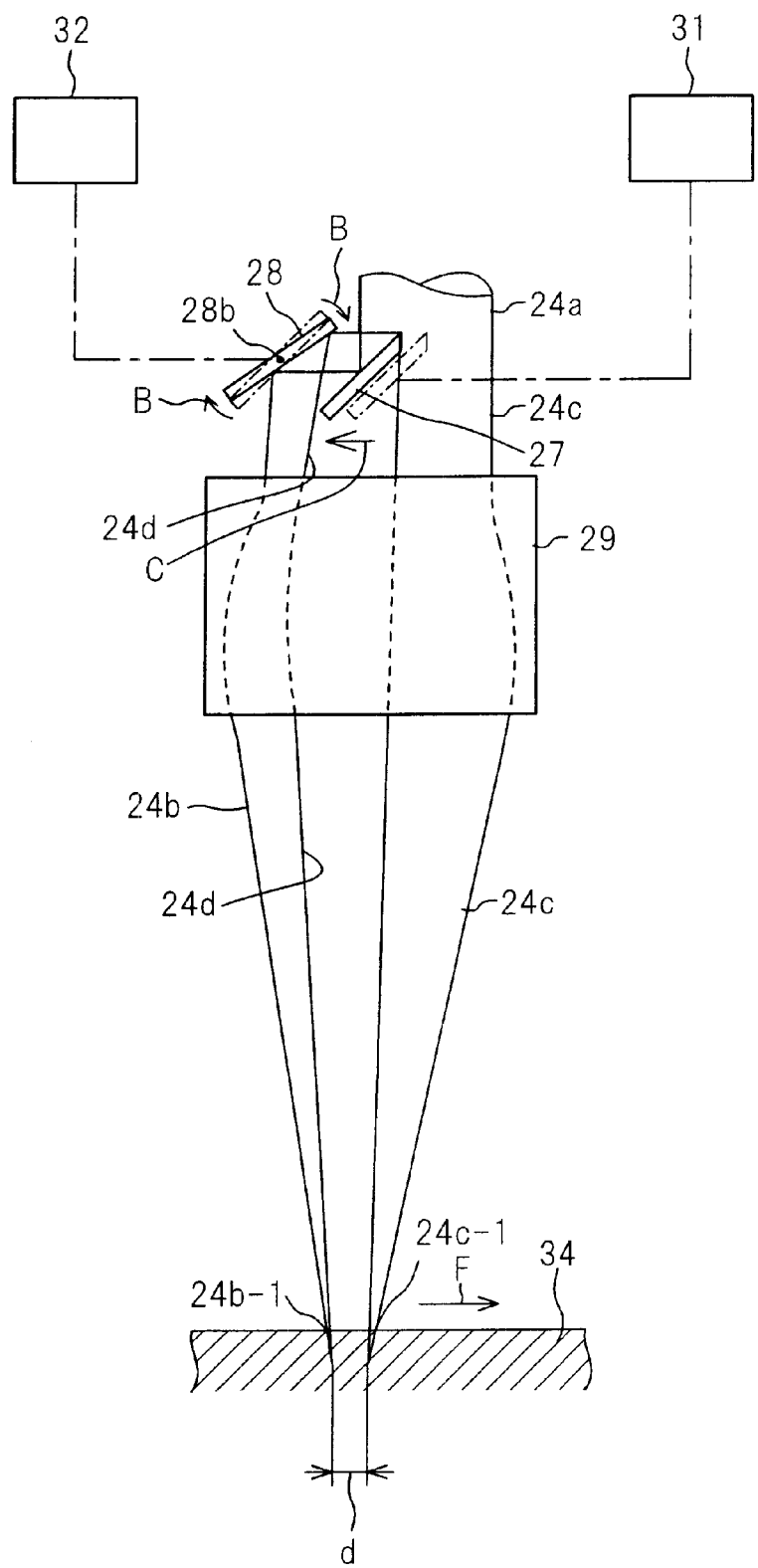
FIG. 8 is an explanation drawing showing a state in which the division ratio for laser beams formed by division in the laser beam machining head is changed, and the focused tips of the laser beams are spaced.

As shown in FIGS. 4, 5A and 5B, the mirror moving device 31 moves the first reflecting mirror 27 in a direction perpendicular to the optical axis of the laser beam 24a (i.e., in a direction of an arrow C or the opposite direction of an arrow D). Hence, when the first reflecting mirror 27 is moved in the direction of the arrow C by the mirror moving device 31 as shown in FIG. 8, the proportion of the first divisional laser beam 24b reflected by the first reflecting mirror 27 decreases, while the proportion of the second divisional laser beam 24c increases. This division ratio can be set, as desired, by adjusting the position to which the first reflecting mirror 27 is moved. When the second reflecting mirror 28 is rotated simultaneously in the direction of the arrow B by the mirror turning device 32, the spacing d between the focused tip 24b-1 of the first divisional laser beam 24b and the focused tip 24c-1 of the second divisional laser beam 24c is enlarged.

The movement of the first reflecting mirror 27 or the rotation of the second reflecting mirror 28 is not necessarily restricted to performance by the mirror moving device 31 or the mirror moving device 32, but may be performed manually.

This laser beam machining head 22, therefore, is composed of the single collimating lens array 26 for making the laser light 24 into a parallel beam; the first reflecting mirror 27 for reflecting part of the laser beam 24a made parallel by the collimating lens array 26 to divide the laser beam 24a into the first divisional laser beam 24b and the second divisional laser beam 24c; the second reflecting mirror 28 for further reflecting the first divisional laser beam 24b reflected by the first reflecting mirror 27 to provide the space portion 24d between the first divisional laser beam 24b and the second divisional laser beam 24c; the single focusing lens array 29 for focusing the first divisional laser beam 24b and the second divisional laser beam 24c onto the portion 34a to be cut; and the GMA electrode 33 disposed in the space portion 24d between the first divisional laser beam 24b and the second divisional laser beam 24c coaxially with the laser beams. Thus, the laser beam machining head 22 obtains the following actions and effects:

Compared with a conventional laser beam machining head in which a laser beam welding head and a GMA welding head are independent, in which perforated lenses are used for coaxial arrangement, or in which concave and convex roof mirrors are used to divide laser light into two beams, the present laser beam machining head 22 is very small in size and inexpensive, and is free from the risk of damaging optical instruments. The inventors have also developed a laser beam machining head in which laser light is divided by a triangular pyramidal mirror into two beams, and these divisional laser beams are focused by individual focusing lens arrays. In this case, the width of the entire laser beam machining head is, for example, as large as about 300 mm. Compared with such a laser beam machining head, the present laser beam machining head 22, configured to focus both of the divisional laser beams 24b and 24c by the single focusing lens array 29, is very compact.

Since the laser beam machining head 22 is very compact, it can be easily mounted on the multi-axis NC robot 23. Since the GMA electrode 33 and the YAG laser light 24 (divisional laser beams 24b, 24c) are coaxial, moreover, the laser beam machining head 22 can be easily positioned and moved to an arbitrary position by the multi-axis NC robot 23, and can perform three-dimensional machining easily.

Furthermore, welding can be performed at a very high speed by coaxial welding using the GMA electrode 33 and the YAG laser light 24 (divisional laser beams 24b, 24c). For example, the welding speed was about 0.4 mm/s with conventional GMA welding. Whereas GMA/YAG coaxial welding permits high speed welding at 2 mm/s. A main reason why high speed welding is possible is that the metal (base material 34) evaporates upon irradiation with the divisional laser beams 24b, 24c, and partly ionizes (into Fe ions, Cr ions, Ni ions), whereupon an arc discharge is induced in the resulting ions to stabilize the arc.

If it is attempted to achieve high speed welding merely by GMA welding without applying the divisional laser beams 24b, 24c, the arc runs shakily and becomes very unstable when the GMA electrode 33 is moved at a high speed. Thus, a continuous bead is not formed, so that high speed welding is impossible. When the divisional laser beams 24b, 24c are applied, on the other hand, the arc is stable even during high speed movement of the GMA electrode 33, so that a continuous satisfactory bead is formed. Besides, the tip of the GMA electrode 33 is heated with heat due to an arc discharge or with Joule heat, and is also heated by irradiation with the laser beams 24b, 24c. This is another cause of high speed welding.

In addition, welding using a pure Ar gas as a shielding gas has been difficult in terms of arc stability, but such welding of an SUS material or a high Cr material in a pure Ar gas atmosphere becomes possible. That is, to stabilize an arc, an inert gas mixed with a small amount of $O_2$ or $CO_2$ is generally used as a shielding gas. When welding an SUS material or a high Cr material, a pure Ar gas has been used as a shielding gas because of the problem of corrosion resistance, and a cored wired containing an arc stabilizing element in a filler wire has been employed as a GMA electrode for stabilization of the arc. With the present laser beam machining head 22, by contrast, the arc can be stabilized by application of the laser beams 24b, 24c as stated earlier. Thus, welding of an SUS material or a high Cr material can be performed in a pure Ar gas atmosphere without the use of a special wire.

When the TIG electrode 42 is disposed coaxially with laser light in the laser beam machining head 22, the same actions and effects as described above can be obtained. Since the laser beam machining head 22 is very compact, its mounting on the multi-axis NC robot 23 is easy, and the laser beam machining head 22 can be easily positioned and moved to an arbitrary position by the multi-axis NC robot 23. Also, the laser beam machining head 22 is inexpensive, is free from the risk of damaging optical instruments, makes high speed welding possible, and permits welding in a pure Ar gas atmosphere.

The spacing between the first divisional laser beam 24b and the second divisional laser beam 24c may be rendered adjustable by making the second reflecting mirror 28 rotatable by means of the mirror turning device 32 or by a manual operation. In this case, the rotation angle of the second reflecting mirror 28 is set appropriately to enlarge the spacing d between the focused tip 24b-1 of the first divisional laser beam 24b and the focused tip 24c-1 of the second divisional laser beam 24c appropriately, as shown in FIG. 7. By so doing, the base material 34 with a large gap width (e.g., a gap width of 1 mm) can be welded.

Also, the division ratio between the first divisional laser beam 24b and the second divisional laser beam 24c may be rendered adjustable by making the first reflecting mirror 27 movable by means of the mirror moving device 31 or by a manual operation, and the spacing between the first divisional laser beam 24b and the second divisional laser beam 24b may be rendered adjustable by making the second reflecting mirror 28 rotatable by means of the mirror moving device 32 or by a manual operation. In this case, as shown in FIG. 8, the moving position of the first reflecting mirror 27 is appropriately set to decrease the proportion of the first divisional laser beam 24b appropriately and increase the proportion of the second divisional laser beam 24c appropriately, and the rotation angle of the second reflecting mirror 28 is appropriately set to enlarge the spacing d between the focused tip 24b-1 of the first divisional laser beam 24b and the focused tip 24c-1 of the second divisional laser beam 24c appropriately. By so doing, the second divisional laser beam 24b is first applied to the base material 34 as indicated by an arrow F to carry out deep weld penetration, and then the first divisional laser beam 24c is applied, whereby a high quality bead can be formed.

At this time, satisfactory welding free from porosity (voids) can be performed. That is, when a single laser beam is applied, porosity tends to occur in the portion to be welded. When the second divisional laser beam 24b is applied first, and then the first divisional laser beam 24c is applied, on the other hand, porosity, which has been once enclosed during application of the second divisional laser beam 24b, is broken open by irradiation with the first divisional laser beam 24b, whereby the porosity can be eliminated.

Also, the coaxial laser beam machining head 22 is configured such that the optical axis of the collimating lens array 26 and the optical axis of the focusing lens array 29 are displaced in a direction perpendicular to the optical axes, whereby the collimating lens array 26 is moved over toward one side relative to the focusing lens array 29 so that the first divisional laser beam 24b reflected by the first and second reflecting mirrors 27 and 28 is entered to the other side of the focusing lens array 29. Thus, as compared with the agreement between the optical axis of the collimating lens array 26 and the optical axis of the focusing lens array 29, the first divisional laser beam 24b and the second divisional laser beam 24c can be focused even by the focusing lens array 29 of a smaller diameter, and the entire laser beam machining head can be made smaller in size.

The laser beam machining apparatus 1 provided with the above-described laser beam machining head 22 is an inexpensive laser beam machining apparatus with excellent welding performance.

Next, other configurations of the coaxial laser beam machining head 22 will be described based on FIGS. 9 to 13A to 13D.

Figure 9:
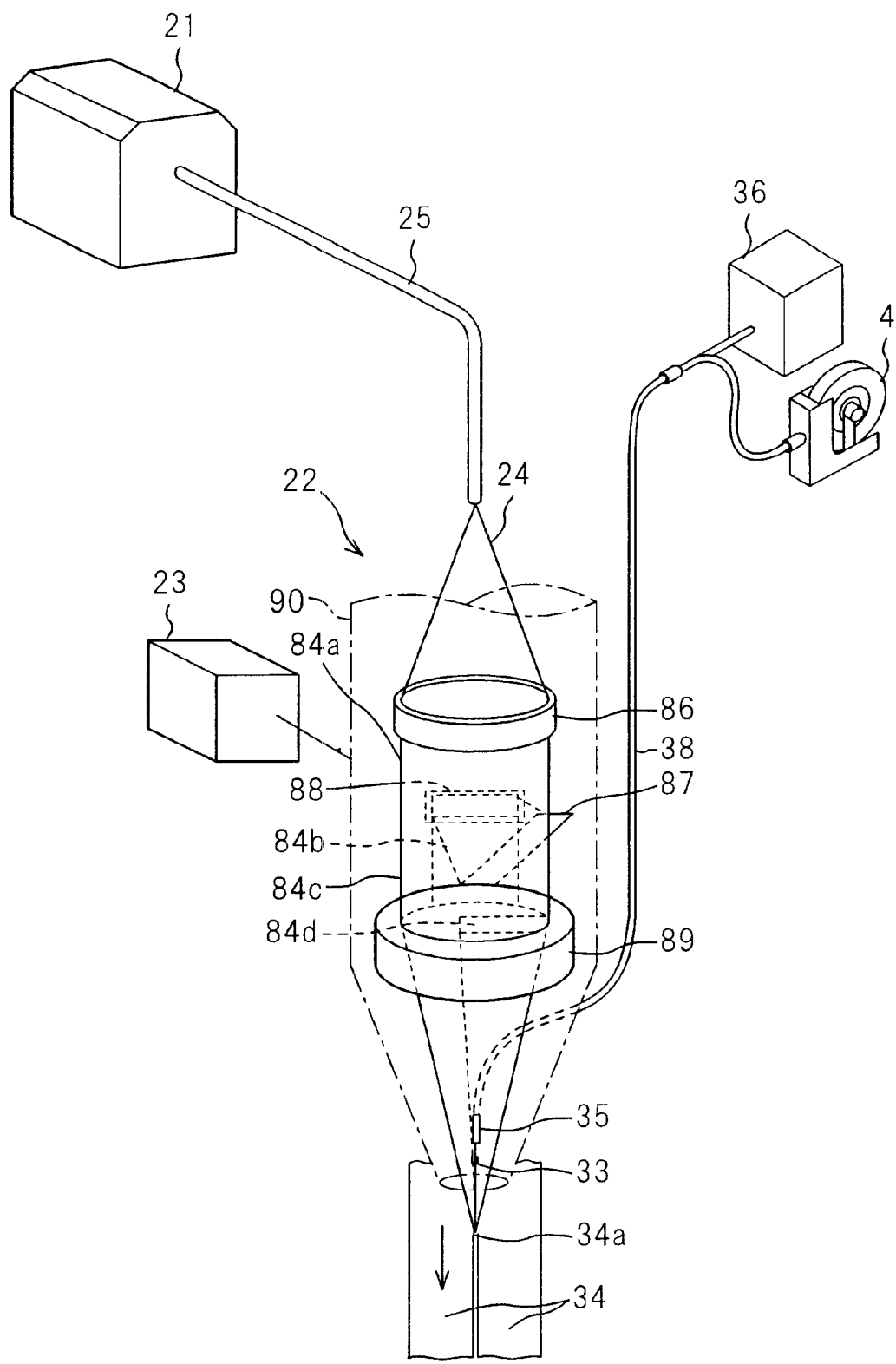
FIG. 9 is a perspective view showing another abridged configuration of a coaxial laser beam machining head according to the embodiment of the present invention.
Figures 11A, 11B:
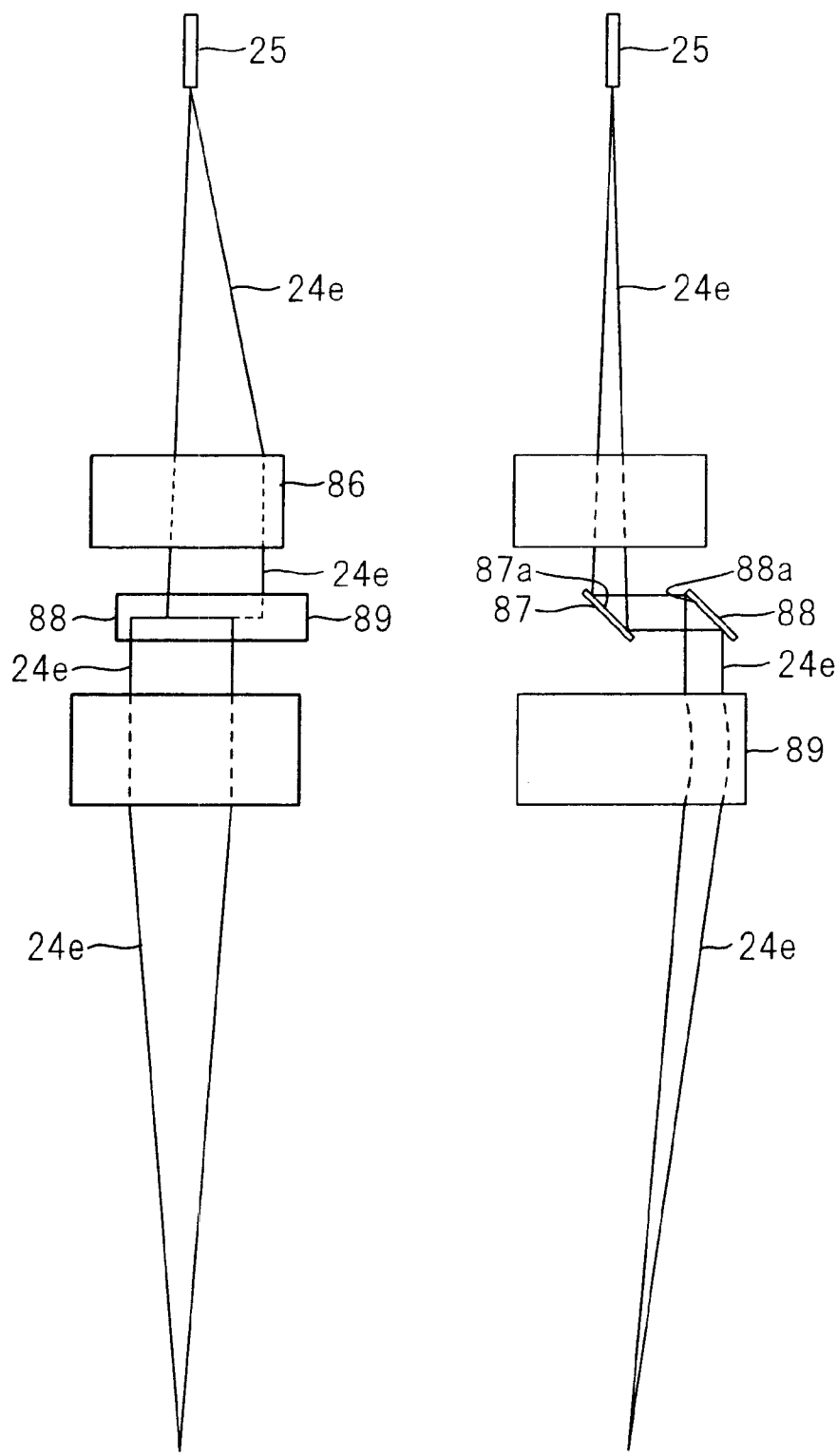
FIG. 11A is a side view showing only part of laser light reflected by reflecting mirrors, a view corresponding to FIG. 10A.
FIG. 11B is a side view showing only part of laser light reflected by reflecting mirrors, a view corresponding to FIG. 10B.

As shown in FIG. 9, a laser beam machining head 22 has in an outer cylinder 90 a collimating lens array 86 as one collimating optical system, a first reflecting mirror 87, a second reflecting mirror 88, a focusing lens array 89 as one focusing optical system, and a GMA electrode (MIG electrode or the like) 33 as a tip machining portion of GMA welding means (MIG welding means or the like).

A detailed description will be offered based on FIGS. 9 to 13A to 13D. The collimating lens array 86 is composed of a plurality of lenses arranged in series for making laser light 24, which has been transmitted by an optical fiber 25, into a parallel beam. The first reflecting mirror 87 and the second reflecting mirror 88 are disposed below the collimating lens array 86 in the drawings, and the focusing lens array 89 is disposed below these reflecting mirrors 87 and 88 in the drawings.

The first reflecting mirror 87 is a slender, rectangular, flat mirror having a predetermined width (a width which enables a space portion of a desired width to be formed in a body of the laser light). The first reflecting mirror 87 is inserted into a laser beam 24a, which has been rendered parallel by the collimating lens array 86, horizontally along a diametrical direction of a cross sectional plane of the laser beam 24a (in a direction perpendicular to the optical axis of the laser beam 24a) as far as a central part of the cross sectional plane (see FIGS. 10A, 11A and 12A), and a reflecting surface 87a of the first reflecting mirror 87 is inclined upward (toward the collimating lens array) and in a direction perpendicular to the direction of insertion of the first reflecting mirror 87 (see FIGS. 10B and 11B; inclined rightward in the drawings in the illustrated embodiment). Thus, the first reflecting mirror 87 reflects part 24e of the laser beam 24a to withdraw it out of a laser beam body 24f. As a result, a slender space portion 24g is formed in the laser beam body 24f (see FIGS. 10B and 11B).

The second reflecting mirror 88 is a slender, flat mirror similar to the first reflecting mirror 87. The second reflecting mirror 88 is disposed outside the laser beam body 24*f*, and has a reflecting surface 88*a* inclined downward (toward the focusing lens array) and toward the first reflecting mirror 87. Thus, according to the second reflecting mirror 88, the part 24*e* of the laser light reflected by the first reflecting mirror 87 is reflected so as to be parallel to the laser beam body 24*f* and to be contiguous to or close to the outer peripheral surface of the laser beam body 24*f* (see FIGS. 10B and 12B). In the illustrated embodiment, the part 24*e* of the laser light is in contact with the outer peripheral surface of the laser beam body 24*f*, thereby making the diameter of the focusing lens array 89 as small as possible.

The arrangement of the first and second reflecting mirrors 87 and 88 is not restricted to the above-mentioned arrangement, but may be as shown in FIGS. 13A to 13D. As shown in FIGS. 13A to 13D, the first reflecting mirror 87 is inserted into the laser beam 24*a* along the diametrical direction of the cross sectional plane of the laser beam 24*a* and obliquely with respect to the optical axis of the laser beam 24*a* (obliquely toward the focusing lens array) (see FIG. 13A), with a reflecting surface 87*a* being directed upward (toward the collimating lens array), and is inclined in a direction perpendicular to the direction of insertion of the first reflecting mirror 87 (see FIG. 13B). Thus, the first reflecting mirror 87 reflects part 24*e* of the laser light outwardly of the laser beam body 24*f* and obliquely (see FIG. 13C).

The second reflecting mirror 88 is disposed outside the laser beam body 24*f*, is oblique relative to the optical axis of the laser beam 24*a* like the first reflecting mirror 87, and is inclined toward the first reflecting mirror 87 (see FIG. 13B), with its reflecting surface 88*a* being directed downward (toward the focusing lens array). Thus, the part 24*e* of the laser light reflected by the first reflecting mirror 87 is reflected so as to be parallel to the laser beam body 24*f* and to be contiguous to or close to the outer peripheral surface of the laser beam body 24*f* (see FIG. 13B).

Figure 12A:
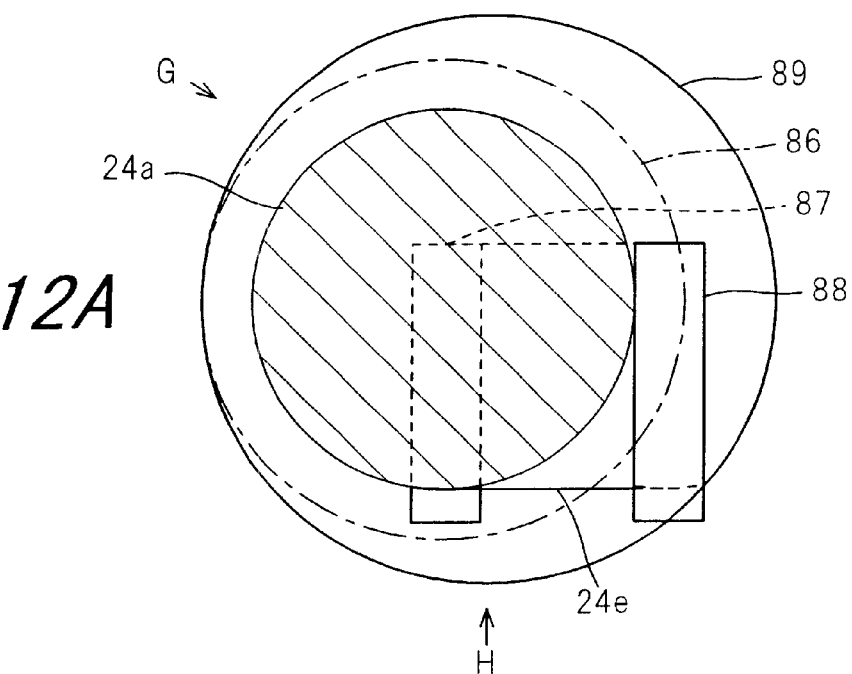
FIG. 12A is a enlarged sectional view taken on line I—I of FIG. 10A.
Figure 12B:
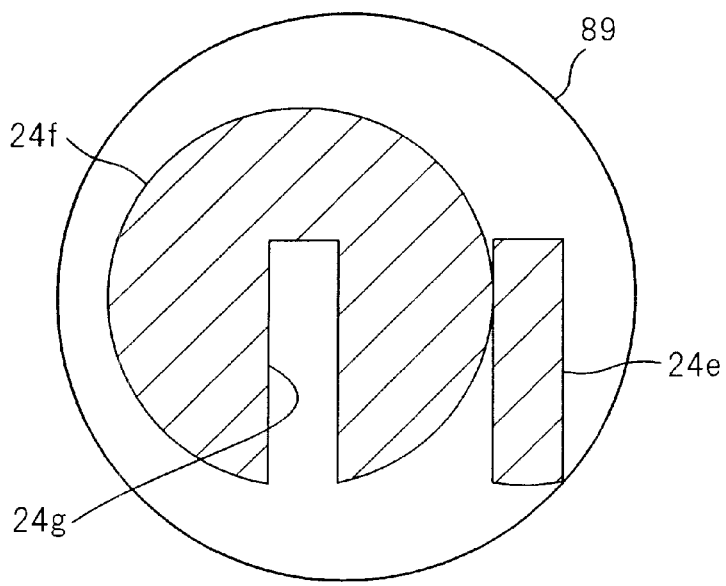
FIG. 12B is a enlarged sectional view taken on line J—J of FIG. 10A.
Figure 12C:
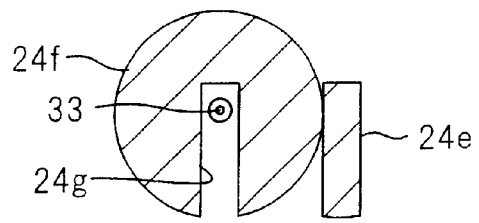
FIG. 12C is a enlarged sectional view taken on line K—K of FIG. 10A.
Figure 13A:
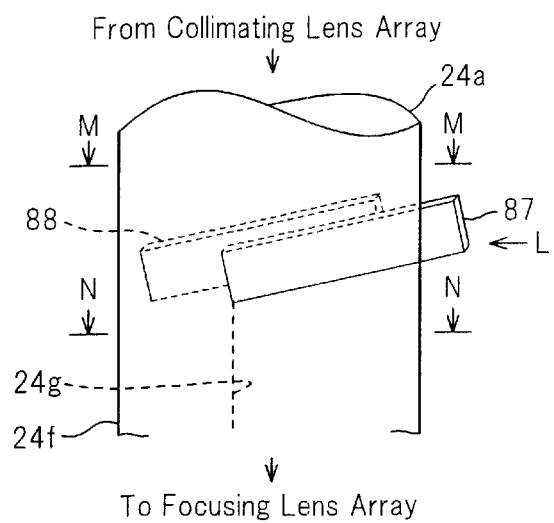
FIG. 13A is an explanation drawing (side view) showing another arrangement example of reflecting mirrors.
Figure 13B:
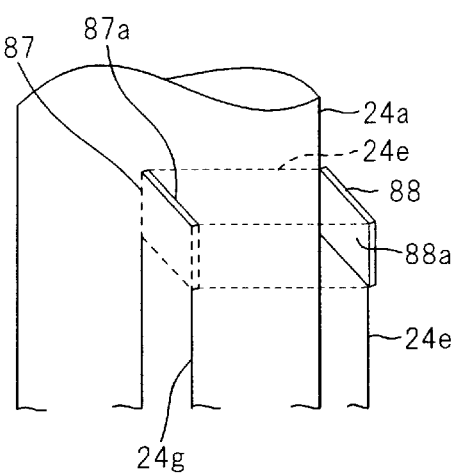
FIG. 13B is an explanation drawing showing another arrangement example of reflecting mirrors, and is a view as viewed from a direction of an arrow L in FIG. 13A.
Figure 13C:
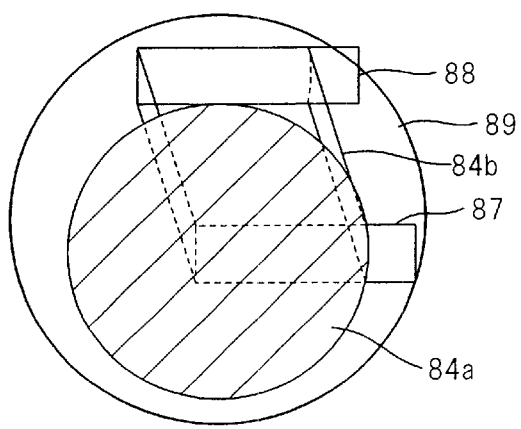
FIG. 13C is an explanation drawing showing another arrangement example of reflecting mirrors, and is a sectional view taken on line M—M of FIG. 13A.
Figure 13D:
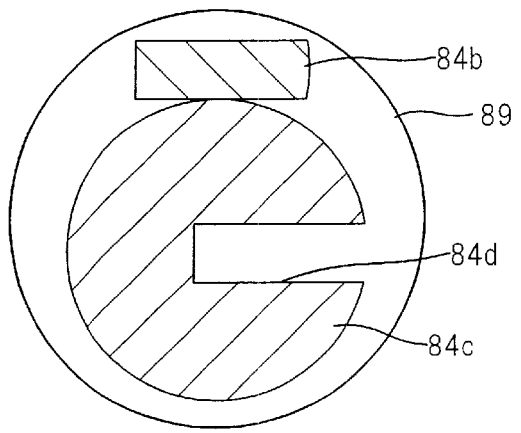
FIG. 13D is an explanation drawing showing another arrangement example of reflecting mirrors, and is a sectional view taken on line N—N of FIG. 13A.
Figure 14:
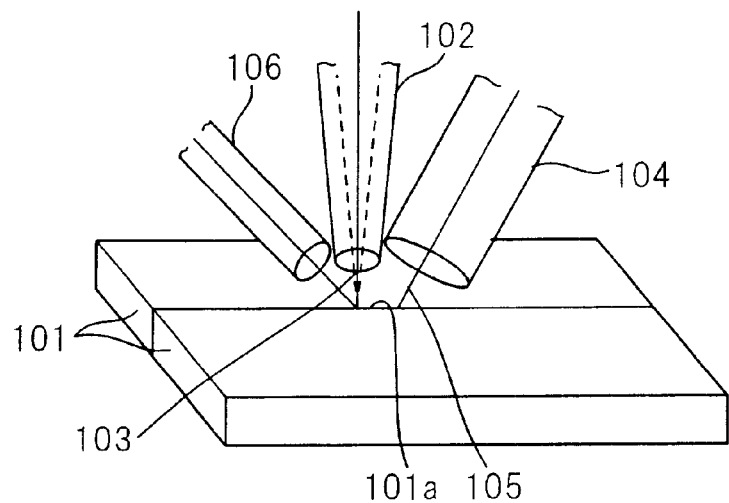
FIG. 14 is a configuration drawing of a conventional laser beam machining head.
Figure 15:
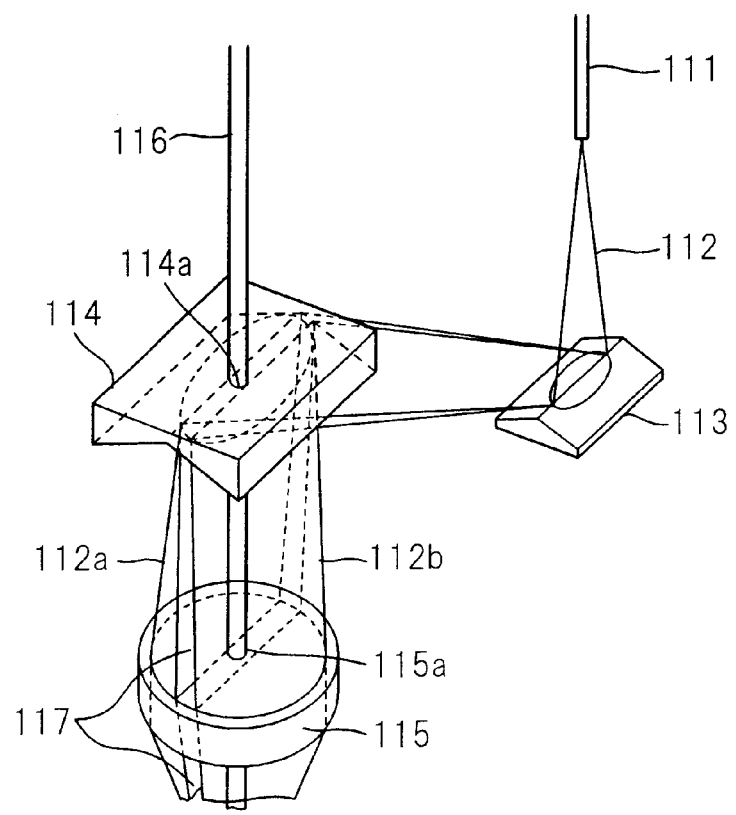
FIG. 15 is a configuration drawing of a conventional laser beam machining head.

In this case, the part 24*e* of the laser light is positioned directly beside the laser beam body 24*f*, as shown in FIG. 13B. Thus, the diameter of the focusing lens array 89 can be made smaller than when the part 24*e* of the laser light is located at a position displaced from the position just beside the laser beam body 24*f*, as shown in FIG. 12B.

The focusing lens array 89 is composed of a plurality of lenses arranged in series, and focuses the laser beam body 24*f*, in which the space portion 24*g* has been formed by the first reflecting mirror 87, and the part 24*e* of the laser light, which has been reflected by the first and second reflecting mirrors 87 and 88, onto the portion 34*a*, to be welded, of the base material 34. At this time, the laser beam body 24*f* and the part 24*e* of the laser light are focused to one point. That is, the laser beam 24*a* is a parallel beam. Thus, even if the optical path lengths of the laser beam body 24*f* and the part 24*e* of the laser light are different between the collimating lens array 86 and the focusing lens array 89, these laser beams 24*e* and 24*f* can be focused to the one point by the focusing lens array 89.

The focusing lens array 89 is somewhat greater in diameter than the collimating lens array 86. The optical axis of the collimating lens array 86 and the optical axis of the focusing lens array 89 are displaced in a direction perpendicular to these optical axes, whereby the collimating lens array 86 is brought to one side (left side in FIG. 10B) relative to the focusing lens array 89, and the part 24*e* of the laser light reflected by the first and second reflecting mirrors 87 and 88 is entered into the other side (right side in FIG. 10B) of the focusing lens array 89.

Because of the above configuration, the laser beam body 24*f* transmitted straightly from the collimating lens array 86 to the focusing lens array 89, and the part 24*e* of the laser light withdrawn outside of the laser beam body 24*f* are incident on the single focusing lens array 89. Since the single focusing lens array 89 focuses both of the laser beam body 24*f* and the part 24*e* of the laser light, the entire laser beam machining head is very small in size. The diameter of the focusing lens array 89 is, for example, about 70 mm.

On the output side of the focusing lens array 89 (the lower side in the drawings), the GMA electrode 33 is supported by the outer cylinder 90 and disposed in the space portion 24*g* of the laser beam body 24*f* coaxially with the laser beam body. According to this configuration, GMA/YAG coaxial welding is possible. Instead of the GMA welding means, TIG welding means as shown in FIG. 3 may be provided.

With this laser beam machining head 22, therefore, the same actions and effects as those of the aforementioned laser beam machining head 22 (see FIG. 4) can be obtained.

That is, the laser beam machining head 22 is composed of the single collimating lens array 86 for making the laser light 24 into a parallel beam; the first reflecting mirror 87 for reflecting part 24*e* of the laser beam 24*a* made parallel by the collimating lens array 86 to withdraw the part 24*e* of the laser beam 24*a* outside of the laser beam body 24*f*, thereby forming the space portion 24*g* in the laser beam body 24*f*; the second reflecting mirror 88 disposed outside the laser beam body 24*f* and adapted to reflect the part 24*e* of the laser light reflected by the first reflecting mirror 87 so as to be parallel to the laser beam body 24*f* and contact or approach the outer peripheral surface of the laser beam body 24*f*; the single focusing lens array 89 for focusing the laser beam body 24*f*, in which the space portion 24*g* has been formed by the first reflecting mirror 87, and the part 24*e* of the laser light reflected by the first and second reflecting mirrors 87 and 88, onto the portion 34*a* to be welded; and the GMA electrode 33 disposed in the space portion 24*g* of the laser beam body 24*f* coaxially with the laser beam body. Thus, the laser beam machining head 22 is very small in size and inexpensive, and is free from the risk of damaging optical instruments, in comparison with conventional laser beam machining heads.

Since the laser beam machining head 22 is very compact, it can be easily mounted on the multi-axis NC robot 33. Since the GMA electrode 33 and the YAG laser light 24 (laser beam body 24*f*) are coaxial, moreover, the laser beam machining head 22 can be easily positioned and moved to an arbitrary position by the multi-axis NC robot 33, and can perform three-dimensional machining easily. Furthermore, welding can be performed at a very high speed by coaxial welding using the GMA electrode 33 and the YAG laser light 24 (the laser beam body 24*f* and part 24*e* of the laser light). Besides, welding of an SUS material or a high Cr material in a pure Ar gas atmosphere also becomes possible.

The use of the TIG welding means shown in FIG. 6 instead of GMA welding means obtains the same actions and effects as described above.

With the present laser beam machining head 22, moreover, the part 24*e* of the laser beam taken out of the laser beam body 24*f* by the first reflecting mirror 87 is further reflected by the second reflecting mirror 88, and focused, along with the laser beam body 24*f*, onto the portion 34*a*, to be welded, by the focusing lens array 89. Thus, the energy of the laser light 24 can be effectively used without waste to minimize the loss of the laser light 24.

Furthermore, as shown in FIGS. 13A to 13D, the first reflecting mirror 87 is inserted into the laser beam 24*a*, which has been rendered parallel by the collimating lens array 86, along a diametrical direction of the cross sectional plane of the laser beam 24a and obliquely relative to the optical axis of the laser beam 24a, and is inclined in a direction perpendicular to the direction of insertion of the first reflecting mirror 87. By so doing, part 24e of the laser beam 24a is reflected obliquely to the outside of the laser beam body 24f. In this case, part 24e of the laser light is positioned just beside the laser beam body 24f. Thus, as compared with part 24e of the laser light being located at a position displaced from the position just beside the laser beam body 24f as shown in FIG. 12B, the diameter of the focusing lens array 89 can be rendered smaller, and the entire laser beam machining head can be made smaller in size.

Also, the laser beam machining head 22 is configured such that the optical axis of the collimating lens array 86 and the optical axis of the focusing lens array 89 are displaced in a direction perpendicular to the optical axes, whereby the collimating lens array 86 is moved over toward one side relative to the focusing lens array 89 so that part 24e of the laser light reflected by the first and second reflecting mirrors 87 and 88 is entered to the other side of the focusing lens array 89. Thus, as compared with the agreement between the optical axis of the collimating lens array 86 and the optical axis of the focusing lens array 89, the laser beam body 24f and part 24e of the laser beam can be focused even by the focusing lens array 89 of a smaller diameter, and the entire laser beam machining head can be made smaller in size.

The laser beam machining apparatus 1 provided with the above-described laser beam machining head 22 is an inexpensive laser beam machining apparatus with excellent welding performance.

Industrial Applicability

As described above, the laser beam machining apparatus of the present invention is useful when applied in performing laser beam welding and arc welding or filler wire welding at the same time.

What is claimed is:

1. A laser beam machining apparatus adapted to perform laser beam welding for welding a portion, to be welded, by transmitting and condensing laser light oscillated by a laser oscillator, and applying the laser light to the portion to be welded, and arc welding or filler wire welding for welding the portion, to be welded, by an arc discharge from an arc electrode, comprising:

control means for exercising control such that the arc discharge from the arc electrode is performed after start of oscillation of the laser light from the laser oscillator, and an output of the laser light from the laser oscillator is stopped after termination of the arc discharge from the arc electrode.

2. The laser beam machining apparatus of claim 1, further comprising:

a coaxial laser beam machining head comprising the arc electrode disposed coaxially with the laser light.

3. The laser beam machining apparatus of claim 2, wherein the coaxial laser beam machining head comprises:

one collimating optical system for making the laser light into a parallel beam;

a first reflecting mirror for reflecting part of the laser light made into the parallel beam by the collimating optical system to divide the laser light into a first divisional laser beam and a second divisional laser beam;

a second reflecting mirror for further reflecting the first divisional laser beam reflected by the first reflecting mirror to form a space portion between the first divisional laser beam and the second divisional laser beam;

one focusing optical system for focusing the first divisional laser beam and the second divisional laser beam onto a portion to be machined; and an arc electrode disposed in the space portion between the first divisional laser beam and the second divisional laser beam coaxially with the laser beams.

4. The laser beam machining apparatus of claim 3, wherein the coaxial laser beam machining head is configured such that the second reflecting mirror is rendered normally and reversely rotatable, whereby spacing between a focused tip of the first divisional laser beam and a focused tip of the second divisional laser beam is adjustable.

5. The laser beam machining apparatus of claim 4, wherein the coaxial laser beam machining head is configured such that an optical axis of the collimating optical system and an optical axis of the focusing optical system are displaced in a direction perpendicular to the optical axes, whereby the collimating optical system is moved over toward one side relative to the focusing optical system so that the first divisional laser beam reflected by the first and second reflecting mirrors is entered to the other side of the focusing optical system.

6. The laser beam machining apparatus of claim 3, wherein the coaxial laser beam machining head is configured such that the first reflecting mirror is rendered movable, whereby a division ratio for the first divisional laser beam and the second divisional laser beam can be adjusted, and the second reflecting mirror is rendered normally and reversely rotatable, whereby spacing between a focused tip of the first divisional laser beam and a focused tip of the second divisional laser beam can be adjusted.

7. The laser beam machining apparatus of claim 6, wherein the coaxial laser beam machining head is configured such that an optical axis of the collimating optical system and an optical axis of the focusing optical system are displaced in a direction perpendicular to the optical axes, whereby the collimating optical system is moved over toward one side relative to the focusing optical system so that the first divisional laser beam reflected by the first and second reflecting mirrors is entered to the other side of the focusing optical system.

8. The laser beam machining apparatus of claim 3, wherein the coaxial laser beam machining head is configured such that an optical axis of the collimating optical system and an optical axis of the focusing optical system are displaced in a direction perpendicular to the optical axes, whereby the collimating optical system is moved over toward one side relative to the focusing optical system so that the first divisional laser beam reflected by the first and second reflecting mirrors is entered to the other side of the focusing optical system.

9. The laser beam machining apparatus of claim 2, wherein the coaxial laser beam machining head comprises:

one collimating optical system for making laser light into a parallel beam;

a reflecting mirror for reflecting part of the laser light made into the parallel beam by the collimating optical system to withdraw the part of the laser light out of a body of the laser light, thereby forming a space portion in the body of the laser light;

one focusing optical system for focusing the body of the laser light, where the space portion has been formed, onto a portion to be machined; and an arc electrode disposed in the space portion of the body of the laser light coaxially with the body of the laser light.

10. The laser beam machining apparatus of claim 2, wherein the coaxial laser beam machining head comprises:

one collimating optical system for making the laser light into a parallel beam;

a first reflecting mirror for reflecting part of the laser light made into the parallel beam by the collimating optical system to withdraw the part of the laser light out of a body of the laser light, thereby forming a space portion in the body of the laser light;

a second reflecting mirror located outside the body of the laser light and adapted to reflect the part of the laser light reflected by the first reflecting mirror so as to be parallel to the body of the laser light and be in contact with or in proximity to an outer peripheral surface of the body of the laser light;

one focusing optical system for focusing the body of the laser light, where the space portion has been formed by the first reflecting mirror, and the part of the laser light reflected by the first and second reflecting mirrors, onto a portion to be machined; and an arc electrode disposed in the space portion of the body of the laser light coaxially with the body of the laser light.

11. The laser beam machining apparatus of claim 10, wherein the first reflecting mirror of the coaxial laser beam machining head is inserted into the laser light, which has been made into the parallel beam by the collimating optical system, along a diametrical direction of a cross sectional plane of the laser light and obliquely relative to an optical axis of the laser light, and is also inclined in a direction perpendicular to a direction of insertion of the first reflecting mirror, whereby part of the laser light is reflected obliquely to an outside of the body of the laser light.

12. The laser beam machining apparatus of claim 11, wherein the coaxial laser beam machining head is configured such that an optical axis of the collimating optical system and an optical axis of the focusing optical system are displaced in a direction perpendicular to the optical axes, whereby the collimating optical system is moved over toward one side relative to the focusing optical system so that the part of the laser light reflected by the first and second reflecting mirrors is entered to the other side of the focusing optical system.

13. The laser beam machining apparatus of claim 10, wherein the coaxial laser beam machining head is configured such that an optical axis of the collimating optical system and an optical axis of the focusing optical system are displaced in a direction perpendicular to the optical axes, whereby the collimating optical system is moved over toward one side relative to the focusing optical system so that the part of the laser light reflected by the first and second reflecting mirrors is entered to the other side of the focusing optical system.

* * * * *